United States Patent [19]

Evans et al.

[11] 3,770,556

[45] Nov. 6, 1973

[54] WRAPAROUND CLOSURE SLEEVE

[75] Inventors: Joseph H. Evans, Palo Alto; Gareth W. Will, Mill Pitas, both of Calif.

[73] Assignee: Reychem Corporation, Menlo Park, Calif.

[22] Filed: Aug. 7, 1970

[21] Appl. No.: 61,999

[52] U.S. Cl. ............... 161/39, 138/99, 138/155, 156/86, 156/215, 156/216, 156/218, 161/43, 161/147, 264/230
[51] Int. Cl. ............................................ B32b 3/00
[58] Field of Search ............... 161/40, 43, 44, 147; 156/85, 86, 212, 213, 214, 215, 216, 217, 218; 138/89, 99, 155

[56] References Cited
UNITED STATES PATENTS

| | | | |
|---|---|---|---|
| 2,797,731 | 7/1957 | Carlson | 156/187 |
| 3,563,825 | 2/1971 | Segura et al. | 156/215 |
| 3,293,100 | 12/1966 | Questel | 161/147 |
| 3,530,898 | 9/1970 | Wilson | 138/99 |
| 3,560,287 | 2/1971 | Helling | 156/218 |
| 3,211,598 | 10/1965 | O'Brien | 156/86 |
| 3,037,868 | 6/1962 | Rosser | 161/147 |
| 3,018,212 | 1/1962 | Chinn | 161/147 |

Primary Examiner—George F. Lesmes
Assistant Examiner—James J. Bell
Attorney—Lyon & Lyon

[57] ABSTRACT

A heat recoverable sleeve is disclosed which is capable of being installed on a longitudinal member without access to a free end. The sleeve comprises a flexible sheet of heat recoverable material having edges which may be overlapped and which have been coated with a contact adhesive. Chloroprene based contact adhesives are disclosed. The coated sheet is wrapped about the longitudinal member and the edges of the sheet are caused to adhere together by the contact cement. In order to prevent the overlapping edge from peeling back during recovery and opening the joint, a restraining member such as a sheet of metallic foil may be adhered to the overlapping edge and the region of the sleeve adjoining the underlapping edge. Alternatively, peeling back may be prevented by cross-linking the overlapping edge. Heating of the sleeve causes it to shrink onto the longitudinal member to form a secure closure.

21 Claims, 9 Drawing Figures

PATENTED NOV 6 1973 3,770,556
SHEET 1 OF 3
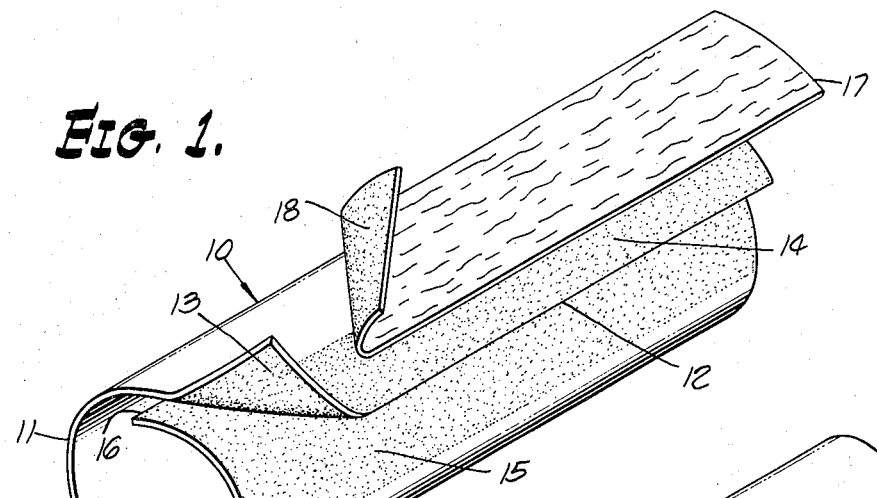
FIG. 1.
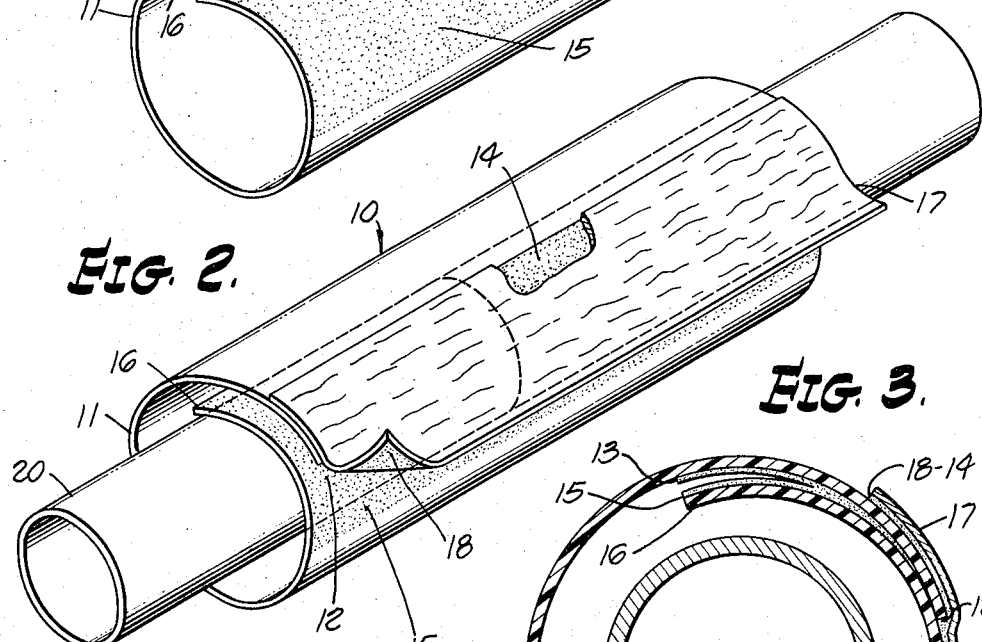
FIG. 2.
FIG. 3.
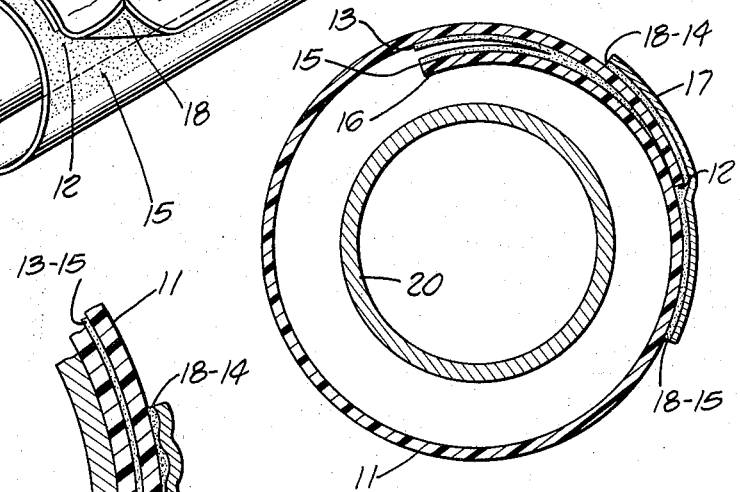
FIG. 4.
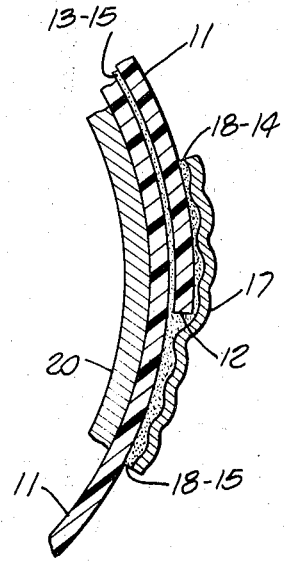
INVENTORS.
JOSEPH H. EVANS
GARETH W. WILL
BY Lyon & Lyon
ATTORNEYS

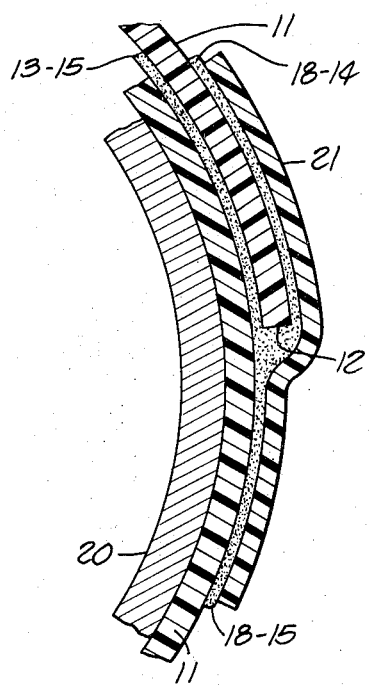
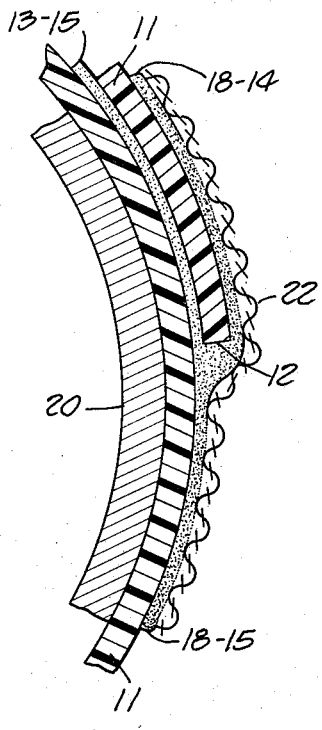
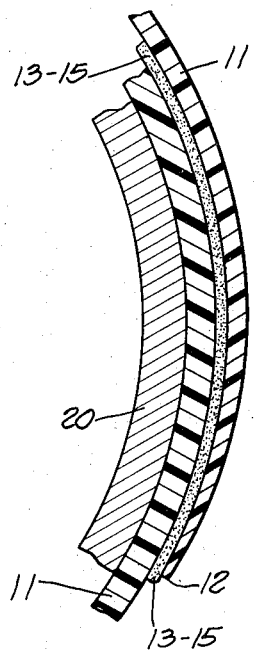

INVENTORS.
JOSEPH H. EVANS
GARETH W. WILL
BY Lyon+Lyon
ATTORNEYS

WRAPAROUND CLOSURE SLEEVE

BACKGROUND OF THE INVENTION

Heat recoverable insulating or corrosion resistant sleeves have found wide application in protecting pipelines, electrical cables and conduits, and the like. Of particular merit are those sleeves which can be installed at any point in a line without requiring access to its end. Such sleeves are commonly known as wraparound sleeves. The problem most commonly encountered in constructing and installing such a sleeve is the provision of a closure device able to withstand the considerable shrinkage forces exerted during recovery of the sleeve and yet simple enough to be manufactured and used in a practical manner. Various sleeves which have solved this problem in a satisfactory manner have been proposed.

A type of wraparound sleeve utilizing a heat shrinkable material is disclosed in U.S. Pat. No. 3,379,218 to Julian S. Conde and assigned to the assignee of the present application. The Conde sleeve is held together by mechanical means which can be selectively engaged or disengaged, as for example, a button and button hole arrangement for holding the overlapping edge of the sleeve in place.

U.S. Pat. No. 3,455,336 to Ellis, also assigned to the assignee of the present application, discloses such a sleeve in which a slip-on channel holds the abutting edges of the sleeve together during recovery.

Application Ser. No. 724,500 filed Apr. 26, 1968 by Clabburn et al and assigned to the assignee of the present application now abandoned discloses a sleeve in which openings formed along the sleeve edges are interlocked and held in position by a member passed through them. Other types of wraparound sleeves are disclosed in Muchmore application Ser. No. 731,200 filed May 22, 1968 now U.S. Pat. No. 3,542,077, Wilson application Ser. No. 771,817 filed Oct. 30, 1968 now U.S. Pat. No. 3,530,898 and Application Ser. No. 771,818 filed Oct. 30, 1968 now U.S. Pat. No. 3,574,313 by Tanaka, all of which are assigned to the assignee of the present invention.

It is evident from the above discussion that a great deal of effort has been expended in the attempt to devise a wraparound sleeve which is simple and economical to fabricate and easy and quick to install. While each of the various devices referred to above satisfactorily accomplishes the function for which it is designed, each in some way requires a more or less involved manufacturing or installation technique. The Conde sleeve cannot readily be fabricated by a relatively inexpensive extrusion process; it is most readily made by molding. The Ellis sleeve, requires the installation of a channel member in the field, the channel member sometimes being quite long. The Clabburn sleeve would be difficult to extrude and also requires the use in the field of a separate fastening member to hold the edges together as does the Wilson device. The Muchmore sleeve utilizes a relatively elaborate extrusion with a metal insert while the Tanaka sleeve requires a threading of tabs into openings prior to recovery.

SUMMARY OF THE INVENTION

The applicants have discovered a wraparound sleeve which is very easy to use. The threading, buttoning, folding and the like of the prior art sleeves are no longer required. The wraparound sleeve can be simply wrapped around the pipe and by touching the outer surface of one edge to the inner surface of the other edge a secure bond is formed. The sleeve is then simply recovered to form a secure closure. The sleeve can be quickly installed by unskilled laborers. Further, the sleeve can be very economically fabricated by utilizing inexpensive extrusion techniques thereby eliminating expensive molding processes. Also the sleeve can be used over a wide variety of pipe sizes. A large overlap is not detrimental. This permits far less inventory to be maintained and further reduces the cost of using the sleeve.

It had been thought that no adhesive could withstand the force exerted by a heat recovery step at the temperature of recovery. The inventors discovered that some contact adhesives were potentially capable of withstanding this force. They further discovered that, when the natural tendency of the outer edge to peel back was overcome, such adhesives could be used in fabricating a simple and economical wraparound sleeve. Adhesives capable of withstanding the recovery force have been made from chloroprene based polymers including neoprene AC, AD, ILA, W, WRT and AF.

The peeling back of the outer edge may be successfully prevented by adhering a cover sheet to the exposed outer edge prior to the recovery step as more fully discussed below. The peeling back may also be prevented by means which do not require an extra cover sheet. It has been discovered that if the overlapping edge is treated to prevent it from recovering, that no peeling back occurs and a secure wrap-around sleeve can be made. One method of treating the outer edge area is to expose this area to a high level of irradiation which forms many crosslinks thereby preventing its subsequent recovery.

BRIEF DESCRIPTION OF THE DRAWINGS

FIG. 1 is a perspective view of a first embodiment of the closure member of the present invention.

FIG. 2 is a perspective view showing the closure member being placed about a pipe.

FIG. 3 shows an end view of the closure member of the present invention prior to shrinking.

FIG. 4 is a cross-sectional view of a portion of the closure member of the present invention having been shrunk on a pipe.

FIG. 5 is a cross-sectional view of a portion of a second embodiment of the closure member of the present invention having been shrunk on a pipe.

FIG. 6 is a cross-sectional view of a portion of a third embodiment of the closure member of the present invention having been shrunk on a pipe.

FIG. 7 is a cross-sectional view of a portion of a fourth embodiment of the closure member of the present invention having been shrunk on a pipe.

Figure 8:
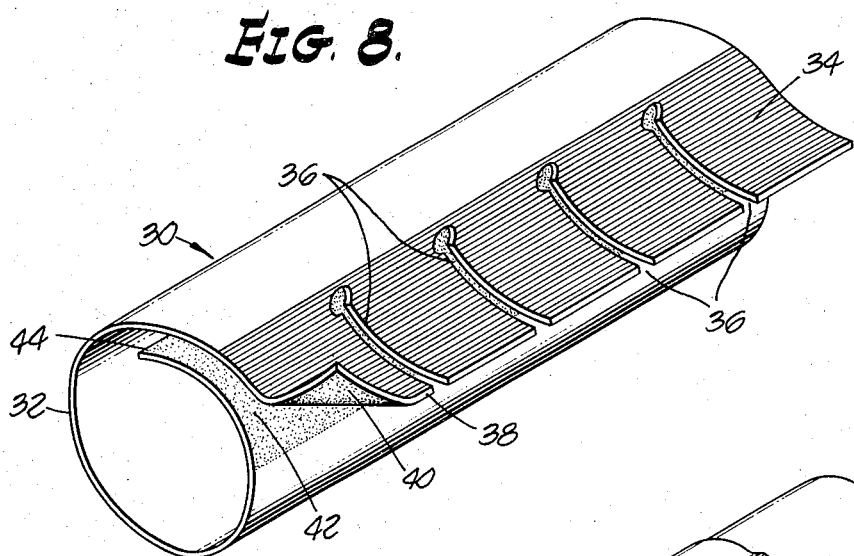
FIG. 8 is a perspective view of a fifth embodiment of the closure member of the present invention.

The present invention comprises the use of an independently dimensional heat unstable member or sleeve as a closure member. For example, such a member or sleeve is made of a material having the property of elastic memory which is heated to above its crystalline melting temperature and expanded under pressure to a diameter greater than its normal diameter and then cooled while kept under pressure. A member or sleeve treated in this manner will retain its expanded position until it is again heated to its crystalline melting temperature at which time it will recover to its original shape. Examples of such heat-recoverable sleeves may be found in Currie U.S. Pat. No. 2,027,962 and Cook et al. U.S. Pat. No. 3,086,242, the disclosures of which are incorporated herein by reference. Polymeric materials which have been cross-linked by chemical means or by irradiation, for example, with high energy electrons or nuclear radiation, such as those disclosed in the Cook et al patent, are preferred for use in the present invention. Other polymeric materials exhibiting the property of plastic or elastic memory, such as polyurethane, ionomers, etc., could also be used in practicing the present invention.

A particularly economical wraparound closure sleeve may be fabricated by simply extruding a tube and rendering it heat shrinkable by the method of Cook and Muchmore U.S. Pat. No. 3,086,242. The heat recoverable tube is then slit longitudinally turned inside out and coated on the appropriate surfaces with a contact adhesive. When this process is used, it has been found preferable to provide means to prevent a peeling back of the outer edge of the sleeve as it is being shrunk around the pipe.

One method which has prevented peeling back is that of cross-linking an area extending back from the outer edge. The circumferential distance of this treatment should extend sufficiently back from the edge so that the adhesive bond at the outer edge can overcome the vertical force generated by peeling back upon recovery. It was found that when the treated area is one inch wide that no peeling back occurred. Cross-linking may cause the edge to expand during recovery and this can be compensated for by cutting axial slits at intervals along the edge. The degree of cross-linking in the edge region may be graded from a maximum at the edge itself to a minimum, which may be zero, at the inner end of the cross-linked area. Where cross-linking is carried out by irradiation, the dose may be graded downward from the edge by interposing a shield between the source and the sleeve margin, which shield may have an edge of tapered thickness (or a saw-tooth edge when the shield is stationary and the sleeve is moved during irradiation). The need for slits is in this case reduced. In this way, the edge itself experiences substantially zero recovery, and the portion given the minimum additional cross-linking experiences substantially the same recovery as the remainder of the sleeve, thereby reducing stresses in the sleeve.

Another simple method for eliminating this problem is to adhere a sheet of aluminum foil over the exposed outer edge prior to a shrinking step. The aluminum foil is believed to be particularly effective because of its ability to wrinkle and deform readiy with the shrinking tube and yet maintain good strength at the temperature required to shrink the tube. Fabric tape may also be used to perform this function. Also a relatively thin strip of heat shrinkable plastic may be adhered over the exposed edge. The thickness of the heat shrinkable plastic cover layer depends on the thickness of the wraparound sleeve and the diameter of the pipe to be covered. If the cover sheet is of the same material as the sleeve, it may have a thickness about equal to the sleeve thickness after recovery to prevent a peeling during heat shrinking. The use of a heat shrinkable cover sheet eliminates a wrinkling which results from the use of aluminum foil which, of course does not shrink with the shrinking sleeve.

The peeling back does not occur when the outer edge is relatively thin. Thus, a wraparound closure sleeve may be fabricated by the use of a tapered sheet where the outer edge is thinner than the body of the sleeve. When the outer edge is thin its tendency to peel back is slight and this tendency is prevented by the contact adhesive. For example, when the thickness of the body of the wraparound sleeve prior to shrinking is 0.03 inches the outer edge should be tapered to about 0.01 inches thick. The peeling back may also be prevented by wrapping an elastic strip around the wraparound sleeve before shrinking.

Turning now to FIG. 1, there is shown a wraparound closure member 10 formed from a flexible sheet of heat recoverable material 11. The inner surface of this flexible sheet is coated with a contact adhesive at a distance inwardly from outer edge 12. This coated area is shown by reference character 13. An area 14 is coated with a contact adhesive on the outer surface of the flexible sheet extending outwardly for a short distance from outer edge 12. Contact adhesive coated area 15 is located on the outer surface of the flexible sheet extending outwardly from inner edge 16. Cover sheet 17 is adapted to be place over outer edge 12 to prevent a peeling back of outer edge 12 during the heat shrinkable step. Cover sheet 17 is coated on its underside with a layer of contact adhesive 18.

FIG. 2 shows the closure member being wrapped about a pipe 20. Cover sheet 17 has been positioned so that approximately half of its width extends beyond outer edge 12. A portion of the coated surface 18 of cover sheet 17 has been brought into contact with coated surface 14 of the flexible sheet 11. Typically, the cover sheet is adhered to the area 14 prior to delivery for use by the installer of the sleeve so that he has only one simple operation to perform.

FIG. 3 shows the closure member having been pressed together prior to a heat shrinking step. Coated areas 13 and 15 have been brought together securing the flexible sheet 11 around pipe 20. Coated area 18 on the underside of cover sheet 17 has been contacted with coated area 14 near outer edge 12 of flexible sheet 11. Coated area 18 of cover sheet 17 has also been contacted with coated area 15 on the outer surface of flexible sheet 12, thereby securing outer edge 12 to the outer surface of flexible sheet 11.

FIG. 4 shows a cross-sectional view of the closure member after it has been heat recovered about pipe 20. A wrinkling of cover sheet 17 is caused by the heat shrinking of flexible sheet 11 and the absence of heat shrinking of cover sheet 17 shown in FIGS. 3 and 4 as metal foil.

FIG. 5 shows a cross-sectional view similar to FIG. 4 except that cover sheet 17 of FIG. 4 has been replaced by plastic cover sheet 21 which, because of its reduced thickness, does not peel back during the heat shrinking step. This plastic sheet may be fabricated from any plastic which will have sufficient strength to prevent peeling back when it is at the recovery temperature of the closure member. It is preferable to use a heat recoverable plastic since this reduces buckling. The heat recovery temperature of the cover sheet should be similar to that of the closure member. This cover sheet should be as thick as possible so long as it has sufficient strength to prevent peeling back. When the closure member and the cover sheet are high density polyethylene, a cover sheet thickness of about 0.01 inches is satisfactory.

FIG. 6 shows a cross-section of the heat recovered sleeve 11 and pipe 20 similar to that shown in FIG. 4. In FIG. 6 the cover sheet 22 is fabric, for example, an asbestos cloth or glass cloth/polyethylene laminate.

FIG. 7 utilizes a different means to prevent a peeling back of outer edge 12. Here flexible sheet 11 is tapered toward outer edges 12 which reduces the tendency of outer edge 12 to peel back. When the closure member is made of high density polyethylene, an edge thickness of about 0.01 inches is satisfactory.

FIG. 8 shows another embodiment of the wraparound closure member which does not require a cover sheet to prevent peeling back during recovery. The wraparound closure member 30 is formed from a flexible sheet 32 which is formed from a heat recoverable material. The shaded area 34 has been treated to an extent where its ability to recover is substantially reduced. Such treating may consist of a cross-linking step which may be accomplished by chemical means or by irradiation as described below. Circumferential slits 36 preferably are cut into the overlapping edge 38 of flexible sheet 32. These slits extend through most of treated area 34 and permit some relative expansion of the treated area during recovery thereby preventing buckling of this outer edge. The underside of the overlapping edge of flexible sheet 32 is coated with an area of contact adhesive 40. This coating 40 extends back from edge 38 at least as far as slits 36 and preferably beyond this. The outer surface of flexible sheet 32 is also coated with a layer of contact adhesive 42. The area of this coating extends back from edge 44 an amount about equal to area 40.

Figure 9:
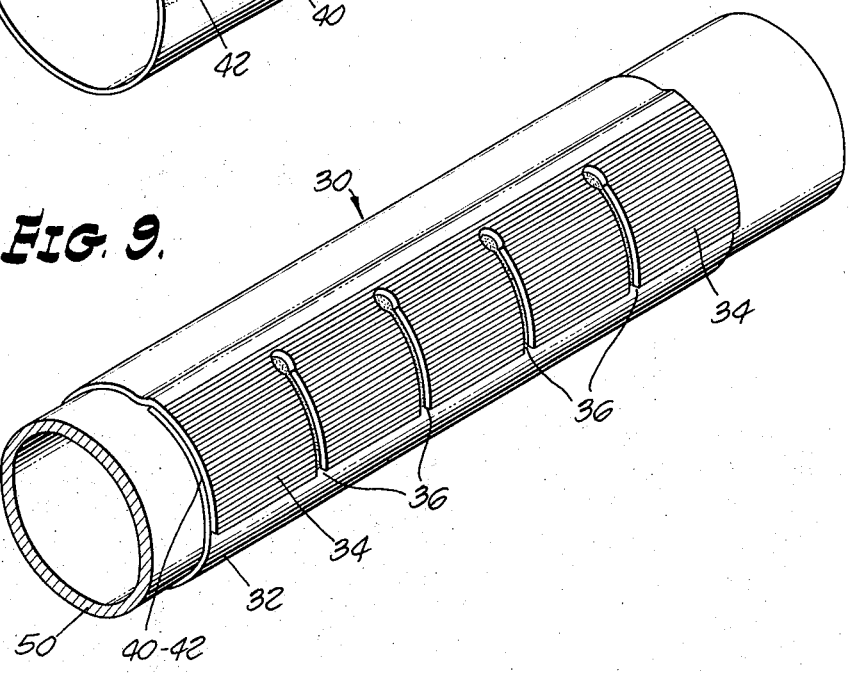
FIG. 9 is a perspective view of the closure member of FIG. 8 having been shrunk on a pipe.

FIG. 9 shows wraparound sleeve 30 recovered about pipe 50. This is accomplished by wrapping the coated flexible sheet shown in FIG. 8 about pipe 50 and contacting coated area 40 with coated area 42. This results in a relatively loose closure which is then caused to recover tightly about pipe 50 by the application of heat. When treated area 34 results from cross-linking by irradiation, this area will tend to expand slightly during heating. The axial slits 36 allow for this expansion and thereby tend to prevent any buckling of this treated outer edge after recovery. No buckling occurred when ⅛ inch wide slits were cut one inch deep along each one inch of sleeve length.

The treatment of area 34 may be any treatment which substantially reduces or eliminates the tendency of that area to recover. One such method is to form sufficient cross links between the molecular chains of the flexible sheet so that recovery will not take place. This cross-linking can be formed by chemical means or by irradiation. Irradiation has proved to be especially useful since it can be carefully controlled to give any desired degree of cross-linking. An irradiation dosage of 40 megarads has been useful to prevent peel back in high density polyethylene. This irradiation of area 34 is believed permanently to cross-link the molecular chains in their pre-recovery orientation so that they will not subsequently recover to any substantial extent with the application of heat.

The selection of a contact adhesive is an important part of this invention. The term "contact adhesive" applies to the type of adhesive that has the ability to form a bond by mating two coated surfaces together. The adhesive is generally applied with a solvent and is coated on each of the mating surfaces and the solvent is permitted to evaporate. After the surfaces have become relatively tack free, they are mated together under enough pressure to result in good contact. The resulting bond is immediately strong enough to hold the piece without further clamping, pressing or curing.

Successful contact adhesives for use in this invention have been formulated based on neoprenes. Neoprenes are a class of polymers based on chloroprene which is the addition polymerization product of chloroprene or 2-chloro-1, 3-butadiene. Preferred neoprenes for use in the present invention include neoprene AC, AD, AF, and ILA. Types AD and AC are fast crystallizing types and represent a good balance of early bond strength and open time. Open time refers to the time after which the adhesive will still form a strong bond when contacted with another adhesive surface. Neoprene AF exhibits fast development of cohesive strength and excellent strength at elevated temperatures. The crystallization rate of neoprene AF is much slower than that of neoprenes AC and AD. Neoprene AF exhibits superior shelf stability as compared with AC or AD. Other neoprenes (for example W, WRT) may be used to give increased open time or reduce crystallinity in the final adhesive, in a manner that will be obvious to those skilled in the art. Neoprene ILA is a copolymer of chloroprene and acrylonitrile. This type is particularly useful for plasticized substrates such as polyvinylchloride.

The adhesion of the neoprene can be improved by the addition of a resin with the neoprene. Tertiary butyl phenolic resins when compounded with neoprene improve adhesion and also give better heat resistance. The resin may be added up to 55 parts per 100 parts of chloroprene polymer and preferably in a range from 20 to 45 parts per 100 parts chloroprene.

Metal oxides function as a resin reactant and form a resinate with tertiary butyl phenolic resins. The metal oxides also function as acid acceptors, scorch retarders and curing agents. Magnesium oxide, calcium oxide, lead oxide (litharge) and lithium oxide all react with the tertiary butyl phenolic resin. Magnesium oxide and zinc oxide function as acid acceptors and magnesium oxide also funtion as a curing agent. The metal oxide level may be between 5 and 15 parts per 100 parts of chloroprene polymer and preferably between 9 to 12 parts. Of the metal oxides, magnesium oxide and zinc in approximately equal amounts are preferred.

Various anti-oxidants may be incorporated in the adhesive to achieve long-term aging. Naphthylamine anti-oxidants are effective but have the disadvantage of staining. Substituted phenols, tertiary butyl paracresol, and hindered bisphenols are useful non-staining anti-oxidants but are not as effective as the naphthylamines.

The choice of solvent system has an important effect upon strength development, open time and ultimate film strength. Blends of aliphatic and aromatic solvents are useful; e.g. a blend of toluene plus varying portions of ketones such as methyl ethl ketone or acetone and esters such as ethyl acetate. Toluene may also be used alone. Where a non-flammable system is needed, chlorinated solvents may be used.

There are various methods by which neoprene solvent cements may be prepared. One is rubber mill mixing of the neoprene and compounding ingredients. Another involves the addition of a solvent slurry of compounding ingredients to a churn with unmilled neoprene and solvent.

Once formulated, the adhesive is applied to the heat recoverable sheet by brushing, spraying, rolling or dipping. The coated sheet is permitted to dry to a relatively tack free film prior to placing the tube around the pipe to be covered. In many applications it will be desirable to coat the tube with adhesive many months before applying it over a pipe. When this is done, it may be necessary to reactivate the adhesive surfaces shortly before application. This may be done by applying a solvent to the film surface or be heating the adhesive film to from 60° to 150°C for about 10 seconds.

The following examples illustrate methods of carrying out the present invention, but it is to be understood that these examples are given primarily by way of illustration and not of limitation.

EXAMPLE I

A 5 inch length was cut from a heat recoverable tubing. The tubing was extruded from high density polyethylene which had been cross-linked by an irradiation dose of 10 megarrads and then expanded from a diameter of 0.7 inches to 2 inches. This length of tubing was slit longitudinally, turned inside out and coated on the following surfaces with a contact adhesive: (1) on the outer surface extending near one cut edge a distance of about 2 inches; (2) on the outer surface extending from the second cut edge outwardly a distance of about three-fourths inch and (3) on the inner surface extending about 2 inches inwardly from the second cut edge.

The contact adhesive used in this example was a commercially available neoprene-based adhesive sold as Roberts Anchor-Weld Contact Adhesive No. 0308.

This adhesive was brushed on the above-described portions of the slit tube and allowed to dry for 5 to 10 minutes at room temperature. It was also brushed on one side of a 5 inch long strip of 0.001 inch aluminum foil which was 1.5 inches wide and this was allowed to dry for about 5 minutes.

The tube was then wrapped around a joint in a one inch outside diameter pipe and the cemented areas of the tube were pressed together by hand. The coated aluminum foil was next pressed over the exposed edge. The tube and foil were then heated to about 200°C. by a hot air gun.

The tube shrank around the pipe joint and formed a secure closure. The aluminum foil prevented any peel back of the outer edge of the wraparound sleeve.

EXAMPLE II

A second 5 inch length was cut from a heat recoverable tubing. The tubing was extruded from high density polyethylene which had been cross-linked by an irradiation dosage of 10 megarads and then expanded from a diameter of 0.7 inches to 2 inches. This length of tubing was slit longitudinally and an area along a first edge was exposed to an irradiation dosage of 40 megarads. This area extended from the edge inwardly a distance of 1 ¼ inch. Axial slits ⅛ inch wide and one inch deep were cut on one inch intervals along this edge. The adhesive described in Example I was then applied to the inner surface of the treated edge for a distance of about 2 inches from the edge. The outer surface area extending from the other edge was similarly coated for a distance of 2 inches.

The cement was permitted to dry for 5 minutes when the slit tubing was wrapped around a joint in a 1 ¼-inch pipe. The treated edge became the exposed edge and its coated area was pressed against the coated outer surface extending from the other edge. The wrapped around sleeve was then heated to about 200°C by a Benzomatic (trademark) propane torch. The tube shrank around the pipe forming a secure closure. The irradiation treatment along the outer edge prevented any peeling back during or after recovery.

EXAMPLE III

The procedures of Example I were followed except that, after the drying period, the aluminum foil was pressed only along the outer edge of the slit tube which had been coated to a width of three-fourths inch. The foil was positioned so that one-half of its width extended past the the edge. Silicone treated paper was then placed along the coated portions of the tube to prevent the tube from stocking together. The tube then was set aside at room temperature for two days. It was then relatively tack free to the touch. The cement was reactivated by brushing toluene over its surface. The closure was then formed as described in Example I and a secure closure resulted.

EXAMPLE IV

The following ingredients were mill mixed on a cold 3 inch laboratory mill.

| | |
|---|---|
| Neoprene ILA | 100 parts |
| n-phenyl-alpha-naphthylamine | 2 parts |
| Magnesium Oxide | 4 parts |
| Zinc Oxide | 5 parts |
| TOTAL | 111 parts |

This mixture was cut up and place in a flask containing 40 parts of tertiary butyl phenolic resin sold under the tradename 871 Varcum and 440 parts of toluene. This was mixed overnight with a laboratory stirrer and was then brushed onto the closure member described in Example I.

The dried contact adhesive was relatively tack free and was reactivated either by brushing with a solvent or by reheating to 60°C. Suitable reactivation solvents include dichloromethane, carbon tetrachloride, trichloroethylene, acetone and toluene. The reactivated closure memeber was wrapped around a pipe joint, the exposed edge was covered within aluminum foil by the procedure described in Example 1 and the closure member was heated to cause recovery. A satisfactory joint resulted.

EXAMPLE V

A closure sleeve as described in Example I having a hot melt adhesive applied to its interior surface was shrunk about a splice having a diameter of about an inch in an electrical cable having a diameter of about 0.3 inch. The quality of the sleeve closure was tested by subjecting the encapsulated splice alternately to temperatures of 60°C and −40°C in a repeated 8 hour cycle. No failure of the adhesive or peeling back of the overlap was observed after 105 cycles. A second sample was subjected to a water immersion test. This sample was identical to the first except that one conductor was bared at the splice to show whether water could penetrate the closure. The sample was fully immersed in water at room temperature, and the resistance between the water and the end of the conductor bared at the splice was measured daily for 31 days. The initial resistance was $1.7 \times 10^{13}$ ohms, the final resistance $2.0 \times 10^{13}$ ohms, the reading never falling between $1.7 \times 10^{13}$ ohms on any day.

Thus, it can be seen that the closure sleeve of the present invention provides an effective protective barrier against moisture penetration and provides protection in environments subject to wide temperature variations.

The portion of the wraparound closure sleeve which will contact the longitudinal member may be covered with a corrosion and damp-proof layer. For example, substantially non-crystalline materials having a viscosity of less than $10^{13}$ cps at 23°C (e.g. mastics) may be used. Also, hot melt adhesives, corona-discharge inhibitors, conductive or insulating materials, etc., may also be used depending on the nature of the body or bodies to be covered.

It is to be understood that the particular contact adhesives described are only illustrative embodiments of contact adhesives and that other formulations can equally well be used so long as their lap shear strength is sufficient to withstand the recovery forces. Preferably, the adhesive should be capable of withstanding a force of at least 5 lbs. per inch. Likewise, other means for preventing peel back may be used, and in many instances, the choice will be influenced by the particular member to be covered and its location. As will be obvious to those skilled in the art, closure members according to the present invention can be made in shapes and forms other than that shown and described as may be required to fit various objects. For example, a sheet may be cut so that it could be wrapped around a tee. Further, the closure member need not be a single sheet but could be made from two or more segments. These segments are coated with the above-described adhesive near their edges and these edge areas would be contacted together prior to a recovery step. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A heat recoverable closure member comprising:
   a sheet of heat recoverable material;
   a first area of contact adhesive on said sheet of material near one margin thereof;
   a second area of contact adhesive on said sheet of material positioned at a location to permit engagement with the first layer of adhesive, said contact adhesive being capable of withstanding the shearing force exerted when said heat recoverable material is wrapped around an object and heated to an extent sufficient to cause said material to recover; and
   means to prevent peeling back of said sheet of material during heat recovery of said member.

2. The member of claim 1, wherein said contact adhesive is a rubber cement.

3. The member of claim 2, wherein said rubber cement is a neoprene rubber cement.

4. The member of claim 3, wherein said neoprene rubber cement is selected from the group consisting of neoprene AC, neoprene AD, neoprene ILA and neoprene AF rubber cements.

5. The member of claim 3, wherein said rubber cements contain from 20 to 45 parts per 100 parts of polymer of a tackifying resin and between 9 and 12 parts per 100 parts of polymer of a metal oxide.

6. The member of claim 3 wherein said rubber cement contains from 5 to 55 parts per 100 parts of polymer of a tackifying resin and between 5 to 15 parts per 100 parts of polymer of a metal oxide.

7. The number of claim 6, wherein said tackifying resin is tertiary-butyl phenolic resin.

8. The member of claim 6, wherein said metal oxide is selected from the group consisting of magnesium, lead (11), lithium and zinc oxides.

9. The member of claim 6, wherein said metal oxide is a mixture of zinc and magnesium oxides.

10. The member of claim 1, wherein said means to prevent peeling back comprises a cross-linked area of said piece of material adjacent a second margin thereof, said area being sufficiently cross-linked to prevent any substantial recovery thereof.

11. The member of claim 10, wherein said cross-linked area is formed by irradiation.

12. The member of claim 10, wherein circumferential slits are formed in said second margin to compensate for expansion of said cross-linked area during recovery of said member.

13. A heat recoverable closure member comprising:
    a sheet of heat recoverable material;
    a first area of contact adhesive on the outer surface of said material near one margin thereof;
    a second area of contact adhesive on the inner surface of said material near the second margin thereof, said contact adhesive being capable of withstanding the shearing force exerted when said heat recoverable material is wrapped around an object and heated to an extent sufficient to cause said material to recover; and
    means to prevent peeling back of said second margin during heat recovery of said member.

14. The member of claim 13, wherein said means to prevent a peeling back comprises a sheet of metal foil adhered to said second margin and to an outer surface of said member prior to the heat recovery of said member.

15. The member of claim 13, wherein said means to prevent a peeling back comprises a second margin which is tapered toward its edge.

16. The member of claim 13, wherein said means to prevent a peeling back comprises a fabric tape adhered to said second margin and to an outer surface of said member prior to the heat recovery of said member.

17. The member of claim 13, wherein said means to prevent a peeling back comprises a sheet of heat recoverable material adhered to said second margin and to an outer surface of said member prior to the heat recovery of said member.

18. A heat recoverable closure member comprising:
    a first heat recoverable member having an area of contact adhesive;
    a second heat recoverable member having an area of contact adhesive being capable of being brought into contact with the area on said first member to form an adhesive bond, said contact adhesive being capable of withstanding the shearing force exerted when said members are joined around an object and heated to an extent sufficient to cause said member to recover; and means to prevent a peeling back of either of said members from the other upon recovery of said members.

19. The closure member of claim 18, wherein both of said portions are part of a single piece of heat recoverable material.

20. A heat recoverable member capable of forming a closure over a longitudinal member without the necessity of access to a free end of said member comprising:

a flexible sheet of heat recoverable ethylene based polymer;

a first layer of neoprene based contact adhesive on an upper surface of said sheet near one margin;

a second layer of neoprene based contact adhesive on a lower surface of said sheet positioned on said lower surface at a location directly opposite the first layer when said sheet is wrapped around said longitudinal member; and means to prevent a peeling back of said member during the heat recovery of said member.

21. The member of claim 1, wherein said means to prevent peeling back comprises a cross-linked area of said piece of material adjacent a margin thereof, the extent of said cross-linking at said margin being sufficient to prevent any substantial recovery thereof, the degree of cross-linking decreasing with increasing distance from said margin.

* * * * *